(12) United States Patent
Wu et al.

(10) Patent No.: US 8,681,113 B1
(45) Date of Patent: Mar. 25, 2014

(54) CONCEPT AND OPERATION MODE FOR MULTI MEDIA AIO

(75) Inventors: Chun-Ting Wu, New Taipei (CN);
Chen-Pang Chuang, New Taipei (CN);
Wen-Chung Wu, Taichung (CN);
Chu-Wei Yang, Nantou County (CN)

(73) Assignee: Flextronics AP, LLC, Broomfield, CO (US)

( * ) Notice: Subject to any disclaimer, the term of this patent is extended or adjusted under 35 U.S.C. 154(b) by 150 days.

(21) Appl. No.: 13/246,723

(22) Filed: Sep. 27, 2011

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| | | | |
|---|---|---|---|
| 5,247,285 A | 9/1993 | Yokota et al. |
| 5,375,076 A | 12/1994 | Goodrich et al. |
| 5,768,163 A | 6/1998 | Smith, II |
| 5,926,364 A | 7/1999 | Karidis |
| D416,003 S | 11/1999 | Schiefer |
| 6,341,061 B1 | 1/2002 | Eisbach et al. |
| 6,351,372 B1 | 2/2002 | Kim |
| 6,353,529 B1 | 3/2002 | Cies |
| 6,392,871 B1 * | 5/2002 | Yanase ..................... 361/679.07 |
| 6,430,038 B1 | 8/2002 | Helot et al. |
| 6,437,974 B1 | 8/2002 | Liu |
| 6,464,195 B1 | 10/2002 | Hildebrandt |
| 6,480,374 B1 | 11/2002 | Lee |
| 6,483,445 B1 | 11/2002 | England |
| 6,781,823 B1 * | 8/2004 | Nyack ..................... 361/679.29 |
| 6,829,140 B2 | 12/2004 | Shimano et al. |
| 6,845,005 B2 | 1/2005 | Shimano et al. |
| 6,903,927 B2 | 6/2005 | Anlauff |
| 6,972,944 B2 | 12/2005 | Clapper |
| D519,500 S | 4/2006 | Maskatia et al. |
| 7,035,665 B2 | 4/2006 | Kido |
| 7,061,472 B1 | 6/2006 | Schweizer et al. |
| 7,068,497 B2 | 6/2006 | Chu |
| 7,107,084 B2 | 9/2006 | Duarte |
| 7,180,731 B2 | 2/2007 | Titzler et al. |
| 7,215,538 B1 | 5/2007 | Chen et al. |
| 7,239,505 B2 | 7/2007 | Keely et al. |
| 7,255,317 B2 | 8/2007 | Huang |
| 7,280,348 B2 | 10/2007 | Ghosh |
| 7,293,747 B2 | 11/2007 | Wang et al. |
| D557,695 S | 12/2007 | Cheng et al. |
| 7,353,053 B2 | 4/2008 | Prichard et al. |

(Continued)

OTHER PUBLICATIONS

Office Action dated Apr. 26, 2013, U.S. Appl. No. 13/004,768, filed Jan. 11, 2011, Applicant: Chun-Ting Wu, 21pp.

*Primary Examiner* — Nicholas Lee
(74) *Attorney, Agent, or Firm* — Haverstock & Owens LLP (57) ABSTRACT

An all-in-one computer system comprising: a base panel having a top surface and a bottom surface; and a screen panel coupled to and extending from the base panel, the screen panel comprising a screen. In some embodiments, a speaker system is coupled to the bottom surface of the base panel to provide a stand on which the base panel can be supported at an angle with respect to a resting surface, wherein the speaker system is configured to be adjusted along the bottom surface of the base panel to adjust the angle at which the base panel is supported. In some embodiments, a processing unit is communicatively coupled to the tilt sensor and to the screen, wherein the processing unit is configured to switch the screen between a touch mode and a non-touch mode based on the angle sensed by the tilt sensor.

27 Claims, 7 Drawing Sheets

(56) References Cited

U.S. PATENT DOCUMENTS

| | | |
|---|---|---|
| D580,429 S | 11/2008 | Cheng et al. |
| 7,457,108 B2 | 11/2008 | Ghosh |
| 7,492,891 B2 | 2/2009 | Eldon |
| 7,502,222 B2 | 3/2009 | Cheng et al. |
| D590,388 S | 4/2009 | Price et al. |
| 7,565,414 B1 | 7/2009 | Love |
| 7,573,703 B2 | 8/2009 | Chuang et al. |
| 7,633,745 B2 | 12/2009 | Sakakibara et al. |
| 7,652,873 B2 | 1/2010 | Lee |
| 7,708,240 B2 | 5/2010 | Homer et al. |
| 7,715,180 B2 | 5/2010 | Titzler et al. |
| 7,733,331 B2 | 6/2010 | Duarte et al. |
| 7,836,554 B2 | 11/2010 | Fu |
| 7,884,815 B2 | 2/2011 | Fraser et al. |
| 7,898,796 B2 | 3/2011 | Horie |
| 7,911,783 B2 | 3/2011 | Hsieh |
| 7,929,298 B2 | 4/2011 | Hsu |
| 7,934,689 B2 | 5/2011 | Chiu et al. |
| 8,208,249 B2 | 6/2012 | Chin et al. |
| 8,229,522 B2 | 7/2012 | Kim et al. |
| D669,467 S | 10/2012 | Ballout |
| 8,280,464 B2 | 10/2012 | Liu |
| 8,289,683 B2 | 10/2012 | Wang |
| 8,306,584 B2 | 11/2012 | Yeh et al. |
| 8,457,696 B2 | 6/2013 | Pegg |
| 2003/0030971 A1 | 2/2003 | Duarte |
| 2004/0057197 A1 | 3/2004 | Hill et al. |
| 2004/0135738 A1 | 7/2004 | Kim |
| 2004/0174666 A1 | 9/2004 | Brandenberg et al. |
| 2004/0228076 A1 | 11/2004 | Clapper |
| 2004/0233620 A1 | 11/2004 | Doczy |
| 2005/0052833 A1 | 3/2005 | Tanaka |
| 2005/0264983 A1 | 12/2005 | Chen |
| 2006/0056143 A1* | 3/2006 | Tatsukami et al. ............ 361/683 |
| 2006/0126284 A1 | 6/2006 | Moscovitch |
| 2006/0187626 A1 | 8/2006 | Ditzik |
| 2006/0264243 A1 | 11/2006 | Aarras |
| 2007/0182663 A1 | 8/2007 | Biech |
| 2007/0217131 A1 | 9/2007 | Kehr |
| 2007/0217135 A1 | 9/2007 | Chuang |
| 2007/0236873 A1 | 10/2007 | Yukawa |
| 2007/0263067 A1 | 11/2007 | Huang et al. |
| 2008/0007904 A1 | 1/2008 | Chen |
| 2008/0024388 A1 | 1/2008 | Bruce |
| 2008/0068786 A1* | 3/2008 | Cheng et al. .................. 361/683 |
| 2008/0180892 A1 | 7/2008 | Lai |
| 2008/0207272 A1 | 8/2008 | Thornton et al. |
| 2008/0232054 A1 | 9/2008 | Chen |
| 2008/0266767 A1 | 10/2008 | Nicholas et al. |
| 2009/0095854 A1 | 4/2009 | Forbes et al. |
| 2009/0190295 A1 | 7/2009 | Chin |
| 2009/0244832 A1 | 10/2009 | Behar et al. |
| 2010/0053876 A1 | 3/2010 | Widmer et al. |
| 2010/0064536 A1 | 3/2010 | Caskey et al. |
| 2010/0267428 A1 | 10/2010 | Wang et al. |
| 2011/0061277 A1 | 3/2011 | Demott |
| 2011/0161809 A1* | 6/2011 | Gilmour ....................... 715/702 |
| 2011/0286170 A1 | 11/2011 | Liu |
| 2012/0176741 A1 | 7/2012 | Wu |
| 2012/0182227 A1 | 7/2012 | Wu |

* cited by examiner

CONCEPT AND OPERATION MODE FOR MULTI MEDIA AIO

FIELD OF THE INVENTION

The present invention relates to the field of all-in-one (AIO) computer systems. More particularly, the present invention relates to an AIO computer system with a speaker system that can be used to adjust the tilt angle of the screen and an adjustable screen operation mode.

BACKGROUND OF THE INVENTION

Current AIO computer systems suffer from a lack of a quality speaker system. Additionally, they are designed for a single mode of operation, such as either personal computing functions (e.g., internet browsing, word processing, etc.) or dedicated media viewing functions (e.g., DVD player). In this respect, current AIO computer systems do not provide the user with the ability to change the mode of operation.

SUMMARY OF THE INVENTION

The present invention provides an AIO computer system with a quality adjustable speaker system. Additionally, the AIO computer system provides the user with the ability to change the screen from touch mode, where the screen can be used as an input device, to non-touch mode, where the screen cannot be used as an input device.

In one aspect of the present invention, an AIO computer system comprises: a base panel having a top surface and a bottom surface opposite the top surface; a screen panel coupled to and extending from the base panel at a divergent angle, wherein the screen panel comprises a screen; and a speaker system coupled to the bottom surface of the base panel to provide a stand on which the base panel can be supported at an angle with respect to a resting surface, wherein the speaker system is configured to be adjusted along the bottom surface of the base panel, thereby adjusting the angle at which the base panel is supported with respect to the resting surface.

In some embodiments, the screen panel is coupled to the base panel at a front end of the base panel, and the speaker system is configured to have its position adjusted along the base panel in directions towards and away from the front end of the base panel. In some embodiments, a coupling member fixed to the bottom surface of the base panel is adjustably coupled to a retaining channel formed within the bottom surface of the base panel, thereby enabling the position of the speaker system to be adjusted along the base panel.

In some embodiments, the base panel and the screen panel are fixed at a permanent angle with respect to one another.

In some embodiments, the speaker system comprises: a stand portion configured to act as the stand on which the base panel can be supported at an angle with respect to a resting surface; and a plurality of speakers configured to be removably coupled to the stand portion of the speaker system. In some embodiments, each speaker in the plurality of speakers is configured to receive an audio signal via wireless communication. In some embodiments, the speaker system further comprises a subwoofer coupled to the stand portion.

In some embodiments, the base panel comprises an optical disc drive. In some embodiments, the speaker system comprises: a stand portion configured to act as the stand on which the base panel can be supported at an angle with respect to a resting surface, and a plurality of controls provided on the stand portion, wherein the plurality of controls are configured to enable a user to control operation of the optical disc drive.

In some embodiments, the system further comprises: a tilt sensor configured to sense an angle at which the base panel or the screen panel is oriented, and a processing unit coupled to the tilt sensor and to the screen, wherein the processing unit is configured to switch the screen between a touch mode and a non-touch mode based on the angle sensed by the tilt sensor, wherein the screen can be used as an input device when in touch mode, and wherein the screen cannot be used as an input device when in non-touch mode. In some embodiments, the processing unit is configured to switch the screen from touch mode to non-touch mode when the sensed angle is within a predetermined non-touch mode angle range, and the processing unit is configured to switch the screen from non-touch mode to touch mode when the sensed angle is within a predetermined touch mode angle range.

In another aspect of the present invention, a method of controlling an operation mode for an AIO computer system having a screen is provided. The method comprises: a processing unit setting the screen on the AIO computer system to non-touch mode in response to the AIO computer system being oriented at an angle that satisfies a predetermined non-touch mode criterion, wherein the screen cannot be used as an input device when in non-touch mode; and the processing unit setting the screen on the AIO computer system to touch mode in response to the AIO computer system being oriented at an angle that satisfies a predetermined touch mode criterion, wherein the screen can be used as an input device when in touch mode.

In some embodiments, the predetermined non-touch mode criterion comprises the MO computer system being oriented at an angle that is within a first range of angles, and the predetermined touch mode criterion comprises the AIO computer system being oriented at an angle that is within a second range of angles, wherein the first range of angles and the second range of angles do not overlap. In some embodiments, the processing unit receives a sensed angle of the AIO computer system from a tilt sensor coupled to the AIO computer system.

In yet another aspect of the present invention, a program storage device readable by a machine, tangibly embodying a program of instructions executable by the machine to perform a method of controlling an operation mode for an AIO computer system having a screen is provided. The method comprises: setting the screen on the AIO computer system to non-touch mode in response to the AIO computer system being oriented at an angle that satisfies a predetermined non-touch mode criterion, wherein the screen cannot be used as an input device when in non-touch mode; and setting the screen on the AIO computer system to touch mode in response to the AIO computer system being oriented at an angle that satisfies a predetermined touch mode criterion, wherein the screen can be used as an input device when in touch mode.

In some embodiments, the predetermined non-touch mode criterion comprises the MO computer system being oriented at an angle that is within a first range of angles, and the predetermined touch mode criterion comprises the AIO computer system being oriented at an angle that is within a second range of angles, wherein the first range of angles and the second range of angles do not overlap.

In yet another aspect of the present invention, an AIO computer system comprises: a base panel having a top surface and a bottom surface opposite the top surface; a screen panel coupled to and extending from the base panel at a divergent angle, wherein the screen panel comprises a screen; a tilt sensor configured to sense an angle at which the base panel or the screen panel is oriented; and a processing unit communicatively coupled to the tilt sensor and to the screen, wherein the processing unit is configured to switch the screen between a touch mode and a non-touch mode based on the angle sensed by the tilt sensor, wherein the screen can be used as an input device when in touch mode, and wherein the screen cannot be used as an input device when in non-touch mode.

In some embodiments, the processing unit is configured to switch the screen from touch mode to non-touch mode when the sensed angle is within a predetermined non-touch mode angle range, and the processing unit is configured to switch the screen from non-touch mode to touch mode when the sensed angle is within a predetermined touch mode angle range.

In some embodiments, the system further comprises a speaker system coupled to the bottom surface of the base panel to provide a stand on which the base panel can be supported at an angle with respect to a resting surface, wherein the speaker system is configured to be adjusted along the bottom surface of the base panel, thereby adjusting the angle at which the base panel is supported with respect to the resting surface.

In some embodiments, the screen panel is coupled to the base panel at a front end of the base panel, and the speaker system is configured to have its position adjusted along the base panel in directions towards and away from the front end of the base panel. In some embodiments, a coupling member fixed to the bottom surface of the base panel is adjustably coupled to a retaining channel formed within the bottom surface of the base panel, thereby enabling the position of the speaker system to be adjusted along the base panel.

In some embodiments, the speaker system comprises: a stand portion configured to act as the stand on which the base panel can be supported at an angle with respect to a resting surface, and a plurality of speakers configured to be removably coupled to the stand portion of the speaker system. In some embodiments, each speaker in the plurality of speakers is configured to receive an audio signal via wireless communication. In some embodiments, the speaker system further comprises a subwoofer coupled to the stand portion.

In some embodiments, the base panel comprises an optical disc drive. In some embodiments, the speaker system comprises: a stand portion configured to act as the stand on which the base panel can be supported at an angle with respect to a resting surface, and a plurality of controls provided on the stand portion, wherein the plurality of controls are configured to enable a user to control operation of the optical disc drive.

In some embodiments, the base panel and the screen panel are fixed at a permanent angle with respect to one another.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein can be applied to other embodiments. Thus, the present invention is not intended to be limited to the embodiment shown, but is to be accorded the widest scope consistent with the principles and features described herein.

In some embodiments, the steps of the present invention are embodied in machine-executable instructions. These instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product that may include a machine-readable medium having stored thereon instructions that may be used to program a computer (or other electronic devices) to perform a process according to the present invention. The machine-readable medium may include, but is not limited to, ROMs, RAMs, magnet or optical cards, or other type of media/machine-readable medium suitable for storing electronic instructions.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Additionally, it is contemplated that process steps can be performed in a different order than the order illustrated in the flowcharts unless otherwise disclosed, either explicitly or implicitly.

Furthermore, it is contemplated that any features from any embodiment can be combined with any features from any other embodiment. In this fashion, hybrid configurations of the disclosed embodiments are well within the scope of the present invention.

FIGS. 1A-5B illustrate an AIO computer system 100 in accordance with some embodiments of the present invention, with like elements being numbered alike. The AIO computer system 100 comprises a base panel 120 having a top surface and a bottom surface opposite the top surface. A screen panel 110 is coupled to the base panel 120 and preferably extends from the base panel 120 at a divergent angle. In some embodiments, the base panel 120 and the screen panel 110 are fixed at a permanent angle with respect to one another. The screen panel 110 comprises a screen 115. A speaker system comprising a stand portion 130 and side speakers 132 is coupled to the bottom surface of the base panel 120. The stand portion 130 provides a stand on which the base panel 120 can be supported at an angle with respect to a resting surface, such as resting surface 150 shown in FIGS. 2A-3.

Figures 2A, 2B:
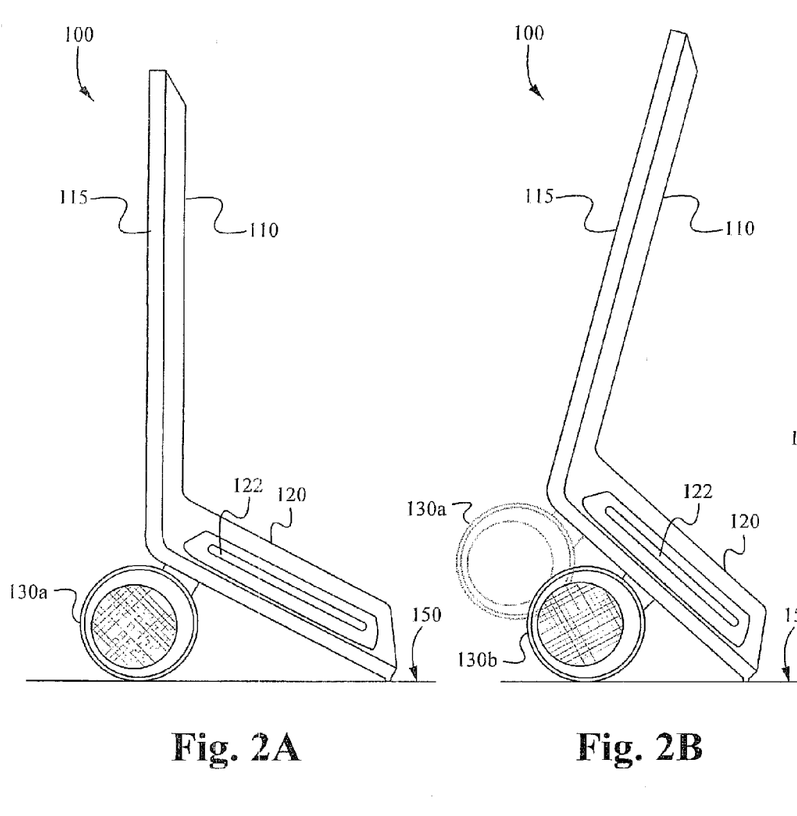
FIGS. 2A-C illustrate side views of the AIO computer system with a speaker stand in different positions in accordance with some embodiments of the present invention.
Figure 2C:
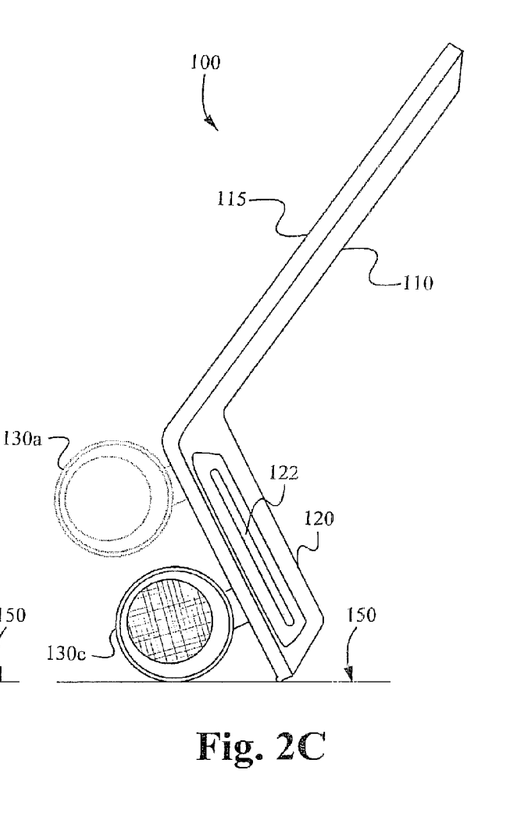

The stand portion 130 of the speaker system is configured to be adjusted along the bottom surface of the base panel 120, thereby allowing a user to adjust the angle at which the base panel 120 is supported with respect to the resting surface 150. In some embodiments, the screen panel 110 is coupled to the base panel 120 at a front end of the base panel 120, and the stand portion 130 is configured to have its position adjusted along the base panel 120 in directions towards and away from the front end of the base panel 120, as shown in FIGS. 2A-C. FIG. 2A shows the stand portion 130a in a location close to the front end of the base panel 120 near where the screen panel 110 meets the base panel 120. In this position, the stand portion 130a supports the MO computer system 100 so that the screen panel 110 is oriented at an angle that is substantially perpendicular to the resting surface 150. FIG. 2B shows the stand portion 130b after it has been moved away from its position (130a) at the front end of the base panel 120. In this position, the stand portion 130b supports the AIO computer system 100 so that the screen panel 110 is oriented at an angle that is slightly pitched back from being perpendicular to the resting surface 150. FIG. 2C shows the stand portion 130c after it has been moved even farther away from its position (130a) at the front end of the base panel 120. In this position, the stand portion 130c supports the AIO computer system 100 so that the screen panel 110 is oriented at an angle that is even more pitched back from being perpendicular to the resting surface 150 than shown in FIG. 2B.

Figure 4A:
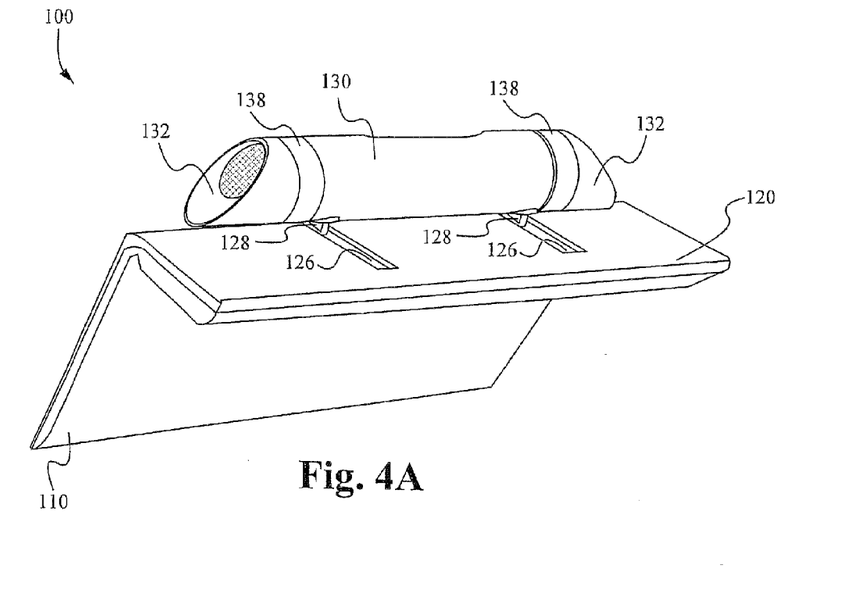
FIGS. 4A-B illustrate perspective views of a speaker system on the bottom surface of the AIO computer system's base panel in accordance with some embodiments of the present invention.
Figure 4B:
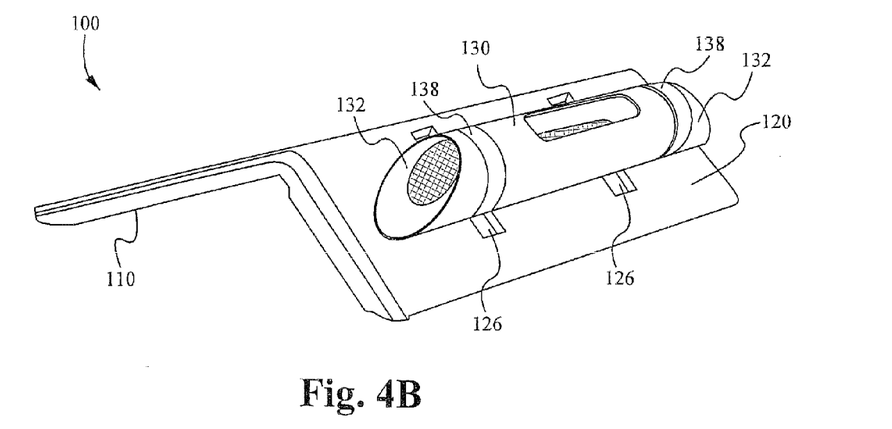

It is contemplated that a variety of means can be employed to enable the position of the speaker system to be adjusted along the base panel 120. In some embodiments, one or more coupling members 128 are fixed to the bottom surface of the base panel 120, as shown in FIGS. 4A-B. Preferably, each coupling member 128 is adjustably coupled to a corresponding retaining channel 126 formed within the bottom surface of the base panel 120, thereby securing the coupling member 128, and thus the speaker system, to the base panel 120, while still providing freedom of movement to allow the position of the speaker system to be adjusted along the base panel 120. FIG. 4A shows the speaker system set to a position along the retaining channel 126 that is on the end of the retaining channel 126 closest to the front end of the base panel 120 where the screen panel 110 meets the base panel 120, similar to the positioning shown in FIG. 2A. FIG. 4B shows the speaker system set to a position centrally located along the retaining channel 126, similar to the positioning shown in FIG. 2B.

In a preferred embodiment, two or more retaining channels 126 are disposed substantially parallel to one another on the bottom surface of the base panel 120. In some embodiments, the retaining channel 126 and its corresponding coupling member 128 are configured to have constant pressure between the two of them, thereby allowing the speaker system to be set to any position along the retaining channel 126. Such constant pressure can be achieved in a variety of ways, including, but not limited to, the edges of the retaining channel 126 applying pressure against the corresponding coupling member 128 or vice-versa. In some embodiments, the retaining channel 126 and its corresponding coupling member 128 are configured to only to allow the speaker system to be set at certain spaced-apart positions along the retaining channel 126.

In some embodiments, the coupling member 128 comprises a hinge, thereby allowing the stand portion 130 to be pivoted vertically with respect to the coupling member 128 and the base panel 120. In other embodiments, the coupling member 128 does not comprise any pivoting means.

In some embodiments, one or more rolling wheels 138 are provided on the stand portion 130 of the speaker system in order to facilitate the adjustment of the stand portion 130 along the base panel 120. The rolling wheel 138 can make the adjustment of the stand portion 130 smooth. In some embodiments, the rolling wheel 138 has a larger diameter than the stand portion 130, thereby allowing the rolling wheel 138 to roll in contact with the base panel 120, while preventing the stand portion 130 from dragging against the base panel 120.

Figure 5A:
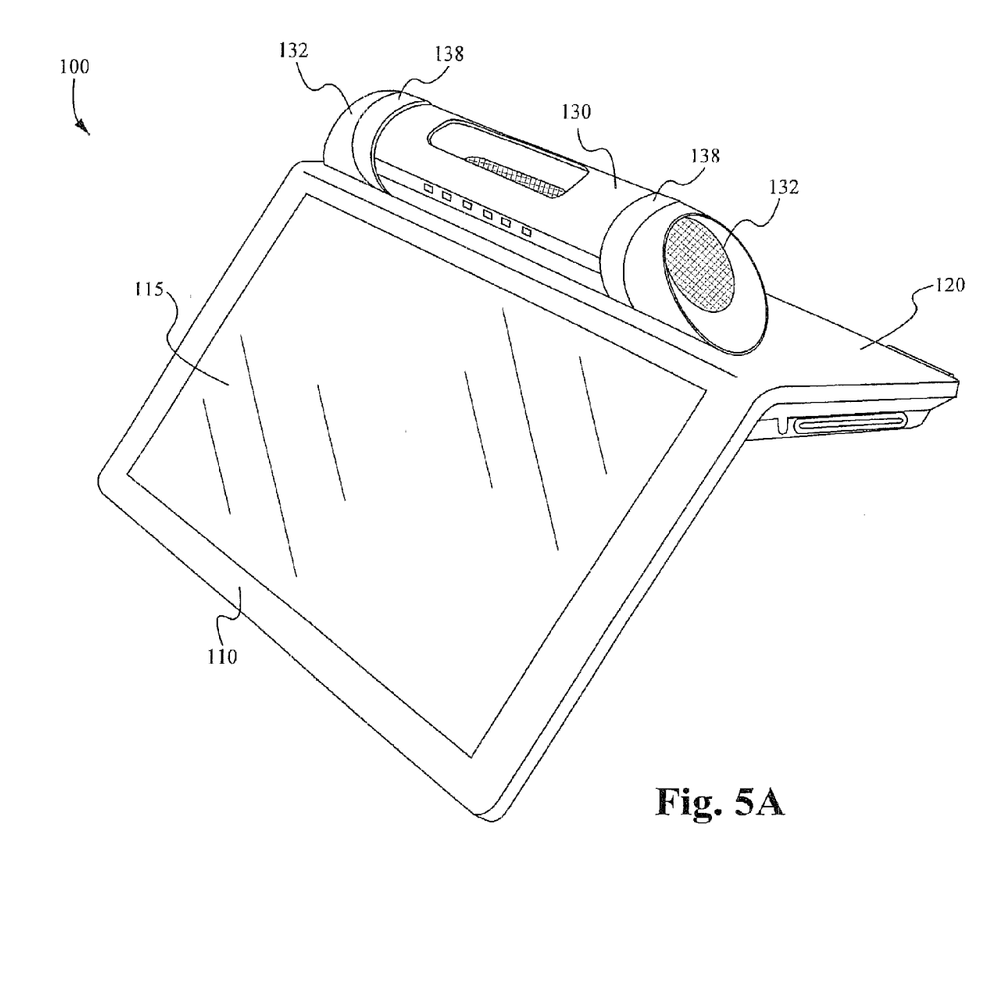
FIG. 5A illustrates a perspective view of the AIO computer system with side speakers attached to a speaker stand on the base panel in accordance with some embodiments of the present invention.
Figure 5B:
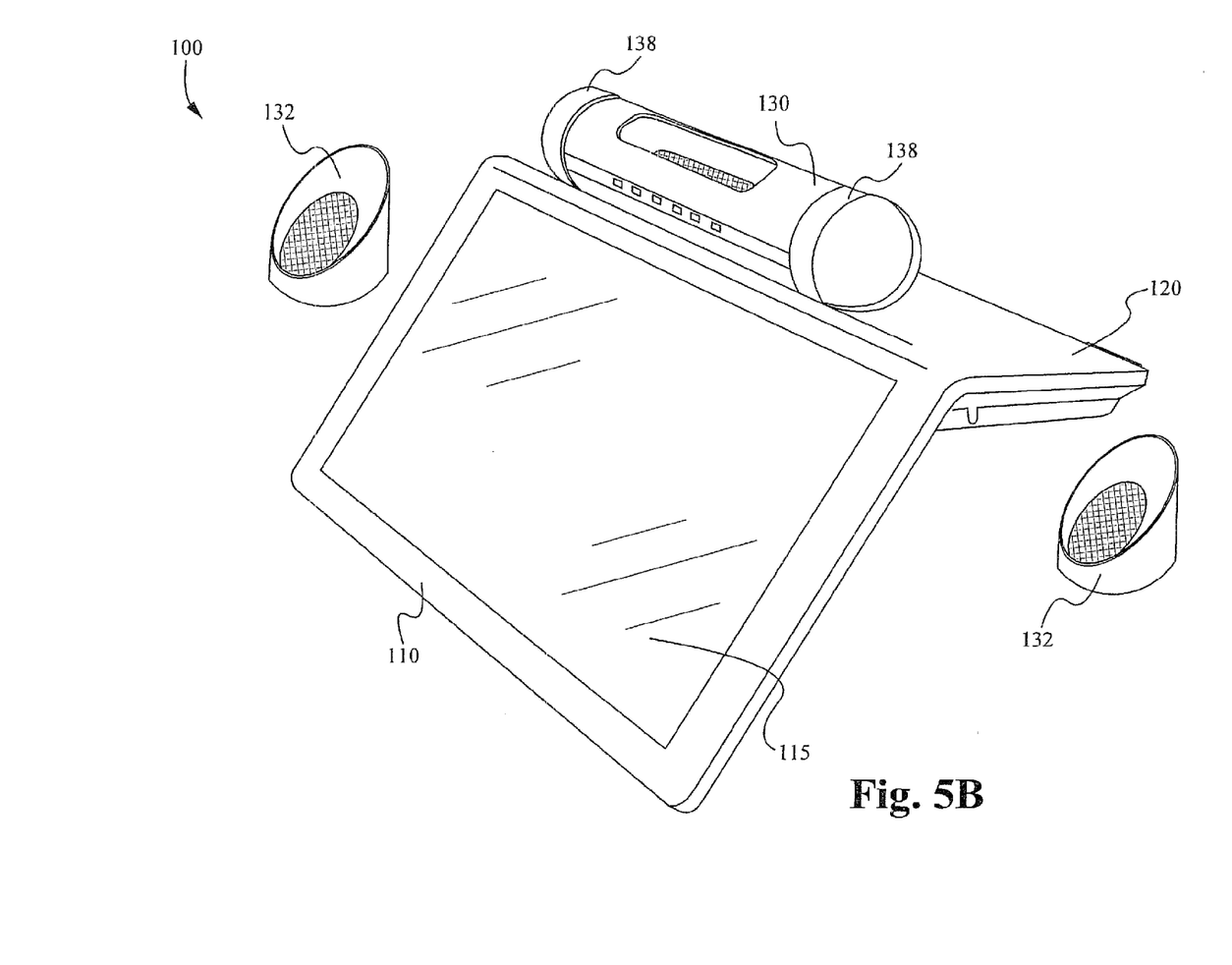
FIG. 5B illustrates a perspective view of the AIO computer system with side speakers detached from the speaker stand on the base panel in accordance with some embodiments of the present invention.

In some embodiments, the speaker system comprises a plurality of speakers 132 configured to be removably coupled to the stand portion 130 of the speaker system. In a preferred embodiments, one speaker 132 is positioned on one end of the stand portion 130, while another speaker 132 is positioned on the opposite end of the stand portion 130, thereby enabling quality stereo sound. As shown in FIG. 5A, the side speakers 132 can be used while they are attached to the stand portion 130. As shown in FIG. 5B, the side speakers 132 can also be removed and placed in a location remote from the stand portion 130. In some embodiments, each speaker 132 is configured to receive an audio signal via wireless communication, such as by using WiFi or Bluetooth technology. In some embodiments, the speaker system also comprises a subwoofer 134 coupled to the stand portion 130.

Figure 1A:
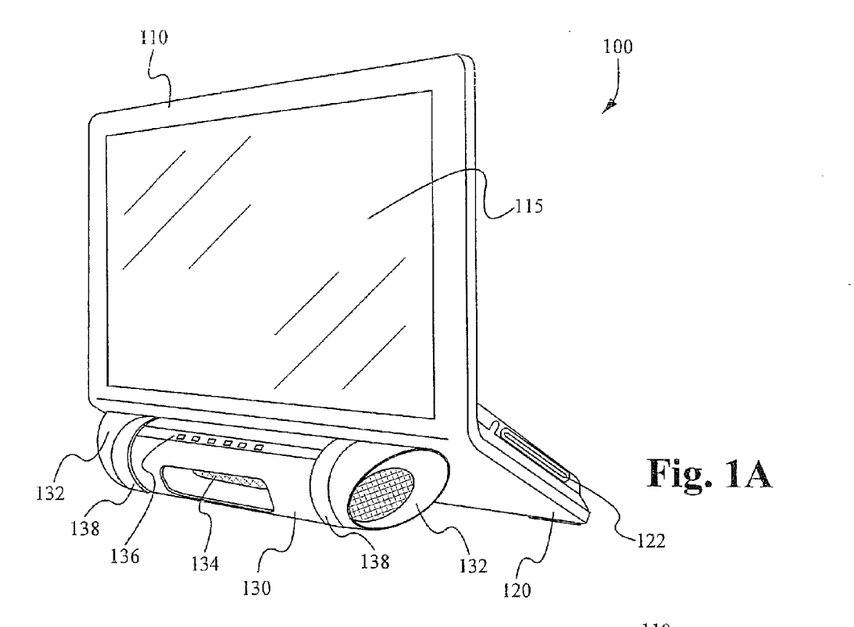
FIG. 1A illustrates a perspective front view of an AIO computer system in accordance with some embodiments of the present invention.
Figure 1B:
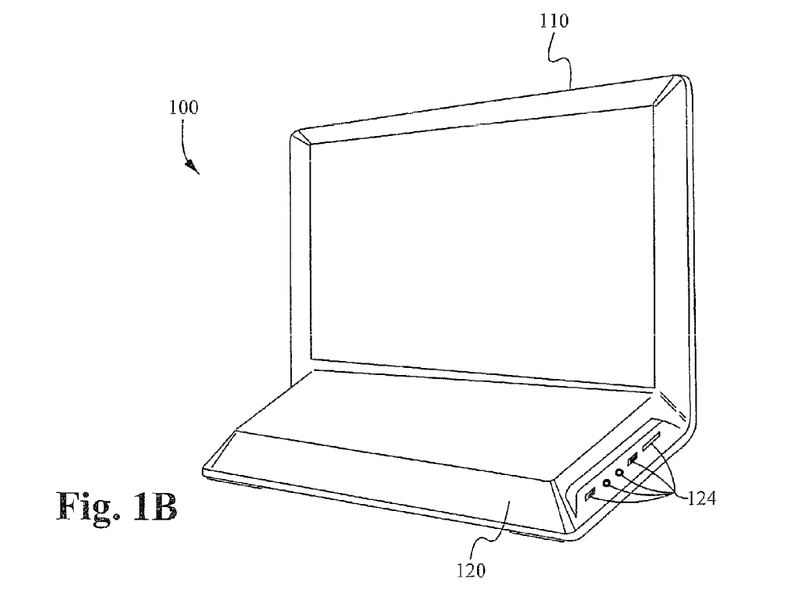
FIG. 1B illustrates a perspective rear view of the AIO computer system in accordance with some embodiments of the present invention.

Preferably, the AIO computer system 100 comprises a processing unit (not shown) communicatively coupled to the screen 115. The processing unit comprises one or more processors and is configured to control the operation (e.g., internet browsing, word processing, media playing, screen display, etc.) of the AIO computer system 100. In some embodiments, the processing unit is housed within the base panel 120. However, it is contemplated that, in some embodiments, the processing unit can be housed within the screen panel 110. In some embodiments, the base panel 120 comprises an optical disc drive 122 configured to read optical media, such as CDs, DVDs, and Blue-ray discs. Preferably, the optical disc drive 122 is communicatively coupled to the screen 115 via the processing unit, such that optical media placed in the optical disc drive 122 can be played on the screen 115. In some embodiments, the stand portion 130 comprises a plurality of controls 136, such as shown in FIG. 1A, that are configured to enable a user to control operation of the optical disc drive 122. For example, the plurality of controls 136 can comprise buttons for commanding the optical disc drive 122 to play, stop, fast-forward, and rewind. In some embodiments, the plurality of controls 136 can additionally or alternatively comprise buttons for controlling certain functional aspects of the speaker system, such as the volume. In some embodiments, the base panel 120 comprises input and/or output jacks 124, as shown in FIG. 1A. These input/output jacks 124 are communicatively coupled to the processing unit and can include, but are not limited to, an audio output jack, an audio input jack, and a USB port.

In a preferred embodiment, the AIO computer system 100 is configured to set the screen 115 to either a touch mode or a non-touch mode based on the orientation of the AIO computer system 100. In touch mode, the screen 115 can be used as an input device, such as with a touch pad. In non-touch mode, the screen 115 cannot be used as an input device, thereby requiring that the user manipulate something other than the screen 115 in order to affect the computing operation of the AIO computer system 100, such as by using the plurality of controls 136.

Figure 3:
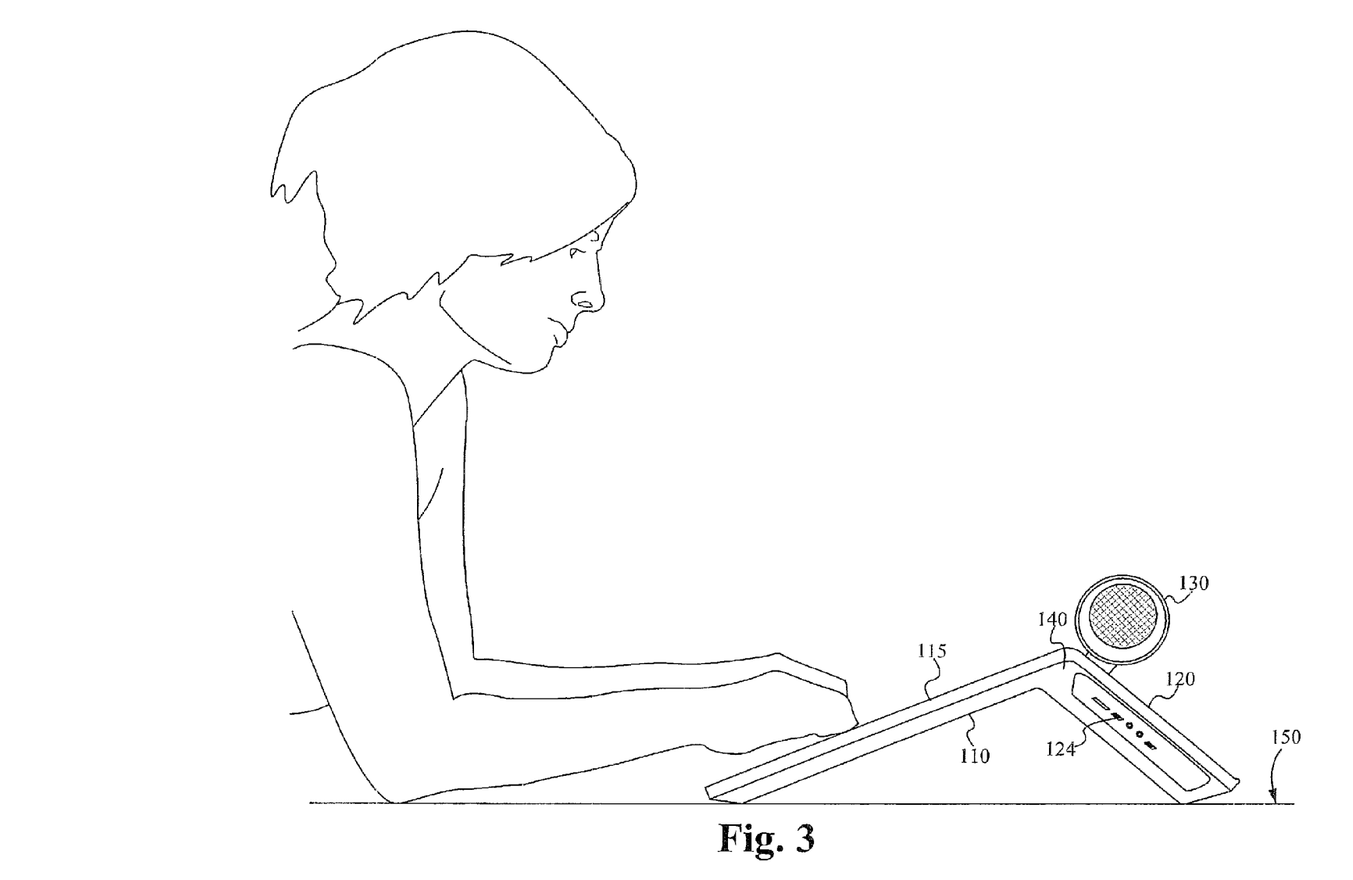
FIG. 3 illustrates a side view of the AIO computer system being used in touch mode in accordance with some embodiments of the present invention.

In some embodiments, the AIO computer system 100 is configured to be used as a media viewing device in certain situations, solely for the use of viewing media on the screen 115, and as a personal computing device in other situations, where it is able to be used for other purposes as well (e.g., internet browsing, word processing, and other typical personal computing functions unrelated to the optical media device). In some embodiments, the AIO computer system 100 is configured to be used solely as a media viewing device when the screen is in non-touch mode, while it is configured to be used as a personal computing device that can perform additional functions when the screen is in touch mode. For example, when a user prefers to use the MO computer system 100 solely to watch a movie, the user can position the system 100 so that the screen 115 is in non-touch mode. In some embodiments, the screen 115 is in non-touch mode when the system 100 is oriented such that both the base panel 120 and the stand portion 130 are positioned to contact a substantially horizontal surface, such as shown in FIGS. 2A-B, whereas the screen 115 is in touch mode when the system 100 is oriented such that both the screen panel 110 and the base panel 120 are positioned to contact a substantially horizontal surface, such as shown in FIG. 3. In both modes, the speakers system can be used to play any appropriate corresponding audio, whether the side speakers 132 are attached to the stand portion 130 or separated.

In some embodiments, the system 100 comprises a tilt sensor (not shown) configured to sense an angle at which the AIO system (e.g., the base panel or the screen panel or both) is oriented. Preferably, the tilt sensor is housed within or otherwise coupled to either the screen panel 110 or the base panel 120. In some embodiments, the tilt sensor is located proximate the location where the screen panel 110 meets the base panel 120, such as location 140 shown in FIG. 3. However, it is contemplated that the tilt sensor can be disposed in other locations as well.

In a preferred embodiment, the tilt sensor is communicatively coupled to the processing unit. The processing unit is configured to switch the screen 115 between the touch mode and the non-touch mode based on the angle sensed by the tilt sensor. In some embodiments, the processing unit is configured to switch the screen 115 from touch mode to non-touch mode when the sensed angle is within a predetermined non-touch mode angle range, and the processing unit is configured to switch the screen 115 from non-touch mode to touch mode when the sensed angle is within a predetermined touch mode angle range. In some embodiments, the predetermined non-touch mode angle range is a range of angles corresponding to the screen 115 being in a substantially vertical position, such as the angles starting from a position 90-degrees counter-clockwise from the orientation in FIG. 2A and moving clockwise to a position 90-degrees clockwise from the orientation in FIG. 2A. In some embodiments, the predetermined touch mode angle range is a range of angles corresponding to the screen 115 being in a substantially horizontal position, such as the angles starting from a position 90-degrees clockwise from the orientation in FIG. 2A and moving clockwise to a position 180-degrees clockwise from the orientation in FIG. 2A. However, it is contemplated that other configurations are within the scope of the present invention.

Figure 6:
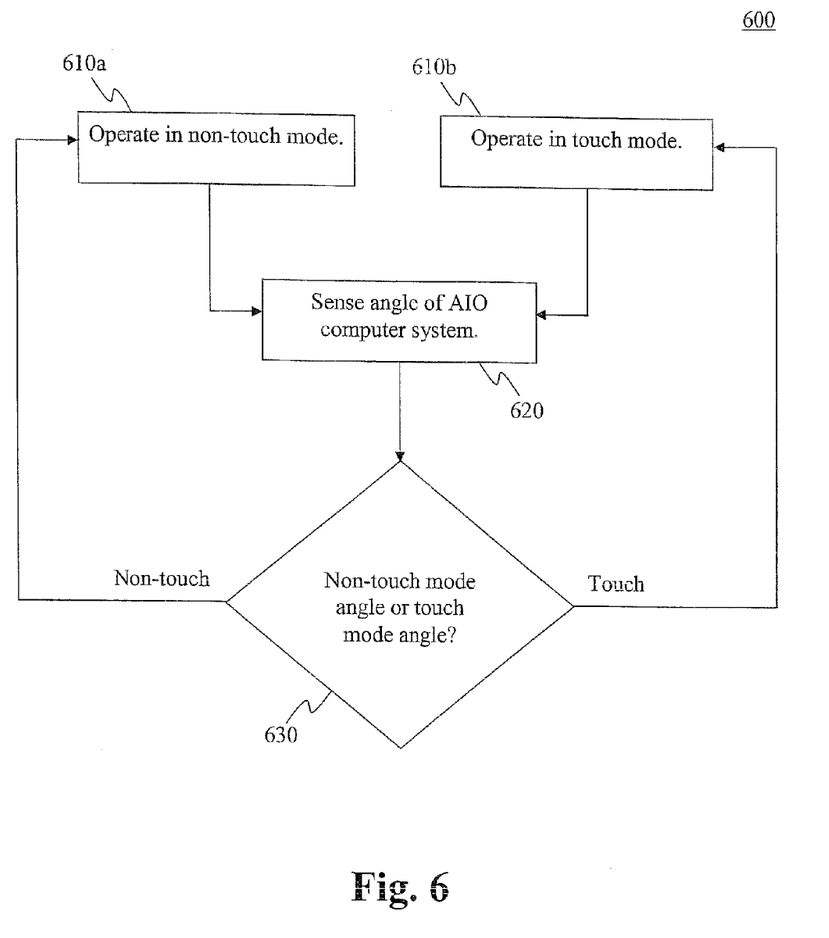
FIG. 6 is a flowchart illustrating a method of controlling an operation mode for the AIO computer system in accordance with some embodiments of the present invention.

FIG. 6 is a flowchart illustrating a method 600 of controlling an operation mode for the MO computer system in accordance with some embodiments of the present invention. The MO computer system can switch between non-touch mode and touch mode in response to a sufficient change in the orientation of the system. It is contemplated that the system can start off in either non-touch mode or touch mode, depending on the angle at which it is oriented.

At step 610*a*, the AIO computer system is operating in non-touch mode, wherein the screen cannot be used as an input device. As discussed above, in some embodiments, the AIO system is configured to be used solely as a media viewing device when the screen is in non-touch mode, thereby preventing the user from using the system for typical personal computing functions unrelated to the optical media device.

At step 620, the system senses the angle at which it is oriented. This angle can include the angle of the base panel, the angle of the screen panel, or both. In a preferred embodiment, a tilt sensor is used to sense the angle and provide it to the processing unit of the AIO system.

At step 630, the processing unit determines whether the sensed angle corresponds to non-touch mode or touch mode based on predetermined criteria. If the sensed angle satisfies a predetermined non-touch mode criterion, then the AIO system continues to operate in non-touch mode at step 610*a*. If the sensed angle satisfies a predetermined touch mode criterion, then the AIO system is set to operate in touch mode at step 610*b*.

At step 610*b*, the AIO computer system is operating in touch mode, wherein the screen can be used as an input device. As discussed above, in some embodiments, the AIO system is configured to be used as a personal computing device when the screen is in touch mode, thereby allowing the user to use the system for typical personal computing functions unrelated to the optical media device.

Again, at step 620, the system senses the angle at which it is oriented. At step 630, the processing unit determines whether the sensed angle corresponds to non-touch mode or touch mode based on predetermined criteria. If the sensed angle satisfies the predetermined touch mode criterion, then the AIO system continues to operate in touch mode at step 610*b*. If the sensed angle satisfies a predetermined non-touch mode criterion, then the AIO system is set to operate in non-touch mode at step 610*a*.

Accordingly, the AIO computer system can switch back and forth between non-touch mode and touch mode based on changes in its orientation that satisfy a certain criteria.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiment chosen for illustration without departing from the spirit and scope of the invention as defined by the claims.

What is claimed is:

1. An all-in-one (AIO) computer system comprising:
  a base panel having a top surface and a bottom surface opposite the top surface;
  a screen panel coupled to and extending from the base panel at a divergent angle, wherein the screen panel comprises a screen; and
  a speaker system coupled to the bottom surface of the base panel to provide a stand on which the base panel can be supported at an angle with respect to a resting surface, wherein the speaker system is configured to be adjusted along the bottom surface of the base panel, thereby adjusting the angle at which the base panel is supported with respect to the resting surface.

2. The system of claim 1, wherein the screen panel is coupled to the base panel at a front end of the base panel, and the speaker system is configured to have its position adjusted along the base panel in directions towards and away from the front end of the base panel.

3. The system of claim 2, wherein a coupling member fixed to the bottom surface of the base panel is adjustably coupled to a retaining channel formed within the bottom surface of the base panel, thereby enabling the position of the speaker system to be adjusted along the base panel.

4. The system of claim 1, wherein the base panel and the screen panel are fixed at a permanent angle with respect to one another.

5. The system of claim 1, wherein the speaker system comprises:
a stand portion configured to act as the stand on which the base panel can be supported at an angle with respect to a resting surface; and
a plurality of speakers configured to be removably coupled to the stand portion of the speaker system.

6. The system of claim 5, wherein each speaker in the plurality of speakers is configured to receive an audio signal via wireless communication.

7. The system of claim 5, wherein the speaker system further comprises a subwoofer coupled to the stand portion.

8. The system of claim 1, wherein the base panel comprises an optical disc drive.

9. The system of claim 8, wherein the speaker system comprises:
a stand portion configured to act as the stand on which the base panel can be supported at an angle with respect to a resting surface; and
a plurality of controls provided on the stand portion, wherein the plurality of controls are configured to enable a user to control operation of the optical disc drive.

10. The system of claim 1, further comprising:
a tilt sensor configured to sense an angle at which the base panel or the screen panel is oriented; and
a processing unit coupled to the tilt sensor and to the screen, wherein the processing unit is configured to switch the screen between a touch mode and a non-touch mode based on the angle sensed by the tilt sensor, wherein the screen can be used as an input device when in touch mode, and wherein the screen cannot be used as an input device when in non-touch mode.

11. The system of claim 10, wherein:
the processing unit is configured to switch the screen from touch mode to non-touch mode when the sensed angle is within a predetermined non-touch mode angle range; and
the processing unit is configured to switch the screen from non-touch mode to touch mode when the sensed angle is within a predetermined touch mode angle range.

12. A method of controlling an operation mode for an all-in-one (AIO) computer system having a screen and a speaker system, the method comprising:
orienting the AIO computer system to an angle by an adjustment to a position of the speaker system;
setting the screen on the AIO computer system to non-touch mode in response to the AIO computer system being oriented at an angle that satisfies a predetermined non-touch mode criterion, wherein the screen cannot be used as an input device when in non-touch mode; and
setting the screen on the AIO computer system to touch mode in response to the AIO computer system being oriented at an angle that satisfies a predetermined touch mode criterion, wherein the screen can be used as an input device when in touch mode.

13. The method of claim 12, wherein:
the predetermined non-touch mode criterion comprises the AIO computer system being oriented at an angle that is within a first range of angles; and
the predetermined touch mode criterion comprises the AIO computer system being oriented at an angle that is within a second range of angles,
wherein the first range of angles and the second range of angles do not overlap.

14. The method of claim 12, wherein the processing unit receives a sensed angle of the AIO computer system from a tilt sensor coupled to the AIO computer system.

15. A program storage device readable by a machine, tangibly embodying a program of instructions executable by the machine to perform a method of controlling an operation mode for an all-in-one (AIO) computer system having a screen and a speaker system, the device comprising:
a processing unit configured for receiving a sensed angle of the AIO computer system from a tilt sensor coupled to the AIO computer system, where the angle of the AIO computer system is based on an adjustment to a position of the speaker system;
the processing unit configured for setting the screen on the AIO computer system to non-touch mode in response to the AIO computer system being oriented at an angle that satisfies a predetermined non-touch mode criterion, wherein the screen cannot be used as an input device when in non-touch mode; and
the processing unit configured for setting the screen on the AIO computer system to touch mode in response to the AIO computer system being oriented at an angle that satisfies a predetermined touch mode criterion, wherein the screen can be used as an input device when in touch mode.

16. The device of claim 15, wherein:
the predetermined non-touch mode criterion comprises the AIO computer system being oriented at an angle that is within a first range of angles; and
the predetermined touch mode criterion comprises the AIO computer system being oriented at an angle that is within a second range of angles,
wherein the first range of angles and the second range of angles do not overlap.

17. An all-in-one (AIO) computer system comprising:
a base panel having a top surface and a bottom surface opposite the top surface;
a screen panel coupled to and extending from the base panel at a divergent angle,
wherein the screen panel comprises a screen;
a tilt sensor configured to sense an angle at which the base panel or the screen panel is oriented; and
a processing unit communicatively coupled to the tilt sensor and to the screen, wherein the processing unit is configured to switch the screen between a touch mode and a non-touch mode based on the angle sensed by the tilt sensor, wherein the screen can be used as an input device when in touch mode, and wherein the screen cannot be used as an input device when in non-touch mode.

18. The system of claim 17, wherein:
the processing unit is configured to switch the screen from touch mode to non-touch mode when the sensed angle is within a predetermined non-touch mode angle range; and the processing unit is configured to switch the screen from non-touch mode to touch mode when the sensed angle is within a predetermined touch mode angle range.

19. The system of claim 17, further comprising a speaker system coupled to the bottom surface of the base panel to provide a stand on which the base panel can be supported at an angle with respect to a resting surface, wherein the speaker system is configured to be adjusted along the bottom surface of the base panel, thereby adjusting the angle at which the base panel is supported with respect to the resting surface.

20. The system of claim 19, wherein the screen panel is coupled to the base panel at a front end of the base panel, and the speaker system is configured to have its position adjusted along the base panel in directions towards and away from the front end of the base panel.

21. The system of claim 20, wherein a coupling member fixed to the bottom surface of the base panel is adjustably coupled to a retaining channel formed within the bottom surface of the base panel, thereby enabling the position of the speaker system to be adjusted along the base panel.

22. The system of claim 19, wherein the speaker system comprises:
 a stand portion configured to act as the stand on which the base panel can be supported at an angle with respect to a resting surface; and
 a plurality of speakers configured to be removably coupled to the stand portion of the speaker system.

23. The system of claim 22, wherein each speaker in the plurality of speakers is configured to receive an audio signal via wireless communication.

24. The system of claim 22, wherein the speaker system further comprises a subwoofer coupled to the stand portion.

25. The system of claim 19, wherein the base panel comprises an optical disc drive.

26. The system of claim 25, wherein the speaker system comprises:
 a stand portion configured to act as the stand on which the base panel can be supported at an angle with respect to a resting surface; and
 a plurality of controls provided on the stand portion, wherein the plurality of controls are configured to enable a user to control operation of the optical disc drive.

27. The system of claim 17, wherein the base panel and the screen panel are fixed at a permanent angle with respect to one another.

* * * * *